Aug. 23, 1927.

S. D. NESMITH

Re. 16,715

ELECTRIC WATER HEATER

Original Filed Oct. 8, 1923

INVENTOR
Samuel D. Nesmith
BY
Kidder & Marquison,
ATTORNEYS.

Reissued Aug. 23, 1927.

Re. 16,715

UNITED STATES PATENT OFFICE.

SAMUEL D. NESMITH, OF SAN DIEGO, CALIFORNIA, ASSIGNOR OF PART INTEREST TO A. S. BRIDGES, J. B. OSBORN, MRS. KATHRYN OSBORN, J. H. BULMER, AND MRS. MARY E. NESMITH, ALL OF SAN DIEGO, CALIFORNIA; ROGER WELLES AND R. R. RICHARDSON, BOTH OF THE UNITED STATES NAVY; E. J. CALLAHAN, OF GUADALAJARA, MEXICO; GEORGE H. SCHMIDT, WALTER C. STITT, F. F. GRANT, H. M. SAMMIS, PAUL J. HARTLEY, AND R. C. EASOM.

ELECTRIC WATER HEATER.

Original No. 1,574,053, dated February 23, 1926, Serial No. 667,221, filed October 8, 1923. Application for reissue filed May 11, 1926, Serial No. 108,409.

My invention relates to electric water heaters, and the objects of my invention are: first, to provide a heater of this class which is provided with a plurality of flat water conducting channels connected in series and which are heated by means of electric heating elements positioned contiguous to and between adjacent water channels, forming a long, continuous, thin film of water with heating elements on both sides, the same being electrically insulated therefrom; second, to provide tubes for a heater of this class, the combined thickness of the opposite wall of which is approximately double that of the film of water passing therethrough; third, to provide a substantially instantaneous electric water heater and a water heater in which the electric current for heating the water in the same is automatically controlled when the water is turned on or off; fourth, to provide an electric water heater in which the electric heating units positioned between the water conducting channels may be readily removed for replacing or repairing the same; fifth, to provide a water heater of this class in which the water conducting channels are thoroughly electrically insulated from the electric heating elements, thus preventing charging of the water passing through said channels; sixth, to provide a water heater of this class which is of novel construction, and, seventh, to provide an electric water heater which is very simple and economical of construction, durable, efficient, and which will not readily deteriorate or get out of order.

With these and other objects in view, as will appear hereinafter, my invention consists of certain novel features of construction, combination and arrangement of parts, as will be hereinafter described in detail and particularly set forth in the appended claims, reference being had to the accompanying drawings and to the reference characters thereon, which form a part of this application, in which,—

Like characters of reference refer to similar parts and portions throughout the several views of the drawings.

Figure 1:
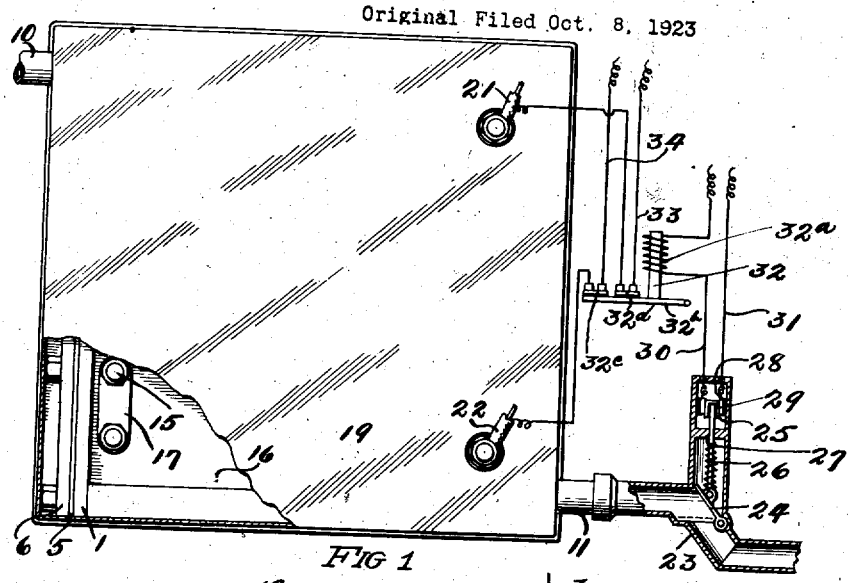
Figure 1 is a front elevational view of my electric water heater with certain parts and portions thereof broken away and in section to facilitate the illustration and showing the same diagrammatically connected with an electric switch and control mechanism.

The water tube supporting members 1 and 2, tie members 3, water tubes 4, heat insulating plates 5, end plates 6 and 7, studs or bolts 8, heat insulating material 9, water conductors 10 and 11, core 12, electric heating elements 13, electric insulating material 14, terminal posts 15, electric insulating plates 16, terminal connecting members 17, nuts 18, casing members 19 and 20, electric conductors 21 and 22, valve casing 23, valve 24, plunger 25, connecting member 26, spring 27, contact members 28 and 29, conductors 30 and 31, relay 32, and the conductors 33 and 34, constitute the principal parts and portions of my water heater structure and control mechanism.

Figure 2:
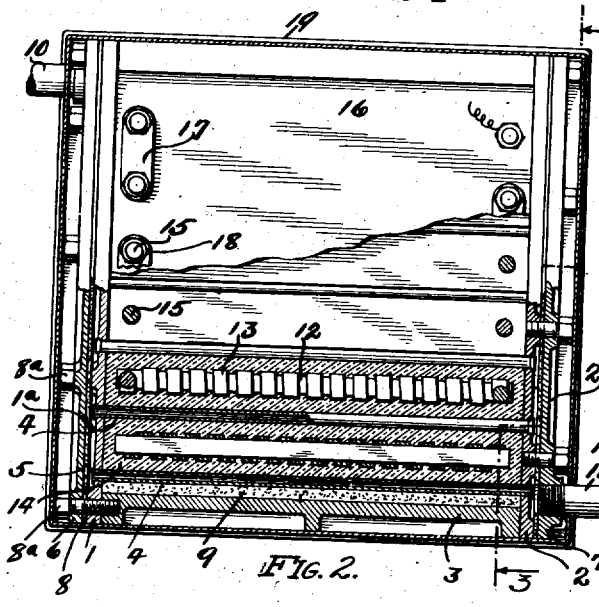
Fig. 2 is a similar view thereof in section, with the section taken through 2—2 of Fig. 3.
Figure 3:
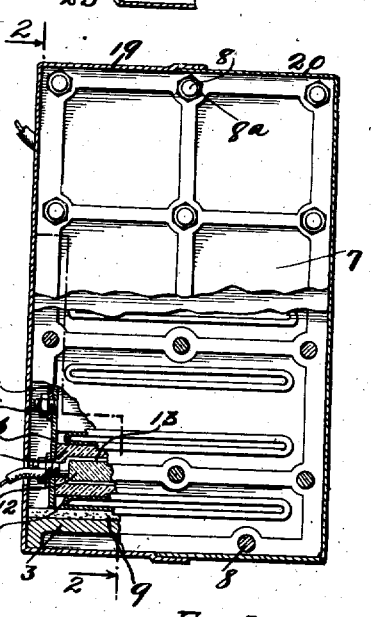
Fig. 3 is a sectional elevational view thereof, taken at right angles to that of Fig. 2 and through 3—3 thereof.

The vertically extending water tube supporting members 1 and 2 of my heater are identical in construction but positioned in reverse order and are supported in spaced relation with each other at their ends by means of the tie members 3 to provide a frame. 4 designates a plurality of horizontally disposed separate water tubes, evenly spaced apart, and extending between the tube-supporting members 1 and 2. Said tubes are independently attached to the supporting members, for example, by passing each end of each tube therethrough and welding or riveting over the projecting ends. The water tubes 4 are preferably made of flattened copper tubing of large diameter, or other material of high heat conductivity, so that a very thin channel for the water is formed, the combined thickness of the opposite walls of each of the channels thus formed being not substantially less than double that of the film of water passing therethrough. There are preferably provided an odd number of water tubes to minimize the cost of construction, and the opposite ends of each alternate pair of tubes are connected by means of recess portions $1^a$ and $2^a$ in the outside faces of the members 1 and 2, substantially as shown in Fig. 2 of the drawings. Positioned against the members 1 and 2 and enclosing the recess portions $1^a$ and $2^a$ are the heat insulating plates 5, against the outer faces of which are positioned the end plates 6 and 7. The end plates, by reason of the recess portions $1^a$ and $2^a$ are spaced at intervals from the face of the members 1 and 2. These end plates are identical in construction and positioned in reverse order relatively to each other. The end plates 6 and 7, the insulating plates 5, and the members 1 and 2, as well as the members 3, are secured relatively to each other by means of the studs 8 and the nuts $8^a$. This construction provides closed or sealed passageways for conducting water from one tube to the adjacent tube to thereby connect all of the water tubes in series. Between the end water tubes 4 and the tie members 3 is provided heat insulating material 9. Secured in the upper end of the end plate 6 is the water outlet conductor 10, communicating with one of the end conductors 4, and positioned and secured in the lower end of the end plate 7 is the water inlet conductor 11, communicating with the water tube at the opposite end of the heater, substantially as shown in Fig. 2 of the drawings.

The electric heating units of my water heater consist of electric heating elements 13 encased in a form or casing 14 of heat-conducting electric-insulating material, preferably alundum. At the ends of the heating elements 13 are provided the outwardly extending terminal posts 15, which extend through the moulded casings 14 and an insulating plate 16, one of which is positioned at the front and another at the back sides of the heater. The terminal posts 15 of each unit are connected with the corresponding posts of the adjacent and oppositely positioned heating elements by means of the connecting members 17 and the nuts 18, as illustrated in the drawings. The heat-conducting, electric-insulating forms with their contained or encased heating elements, are disposed between adjacent tubes, filling the space between the tubes, and, as previously pointed out, are independently removable for the purpose of renewal and repair.

The water heater is preferably enclosed by means of a sectional casing consisting of the members 19 and 20. Through the front side of the casing member 19 extend the conductors 21 and 22, which conductors are preferably connected with the heating unit positioned at the opposite ends of the heater.

The heater is automatically controlled by means of a valve and switch mechanism, which consists of a valve casing 23 secured to the water inlet conductor 11 in which casing is pivotally mounted a valve 24, which is automatically opened when the water is drawn through the heater. The valve member 24 is pivotally connected by means of the connecting rod 26 with the plunger 25 reciprocally mounted in an extended portion of the valve casing 23. A compression spring 27 is positioned around the connecting rod 26 between the valve 24 and the portion serving as a guide for the plunger 25. At the upper end of the plunger 25 is provided a contact member 28, secured thereto and insulated therefrom, which is adapted to engage with and connect the contact members 29 when the valve 24 is opened by reason of the water passing through the heater. The contact members 29 are supported inside of the extended portion of the valve casing 23 and insulated therefrom, and are connected by means of the conductors 30 and 31 with a source of electrical energy. Positioned in the conductor 30 is the solenoid $32^a$ of the relay 32, which, when the valve 24 is opened, is energized, attracting its relay bar $32^b$, which controls the switch of the conductors connected with the heating units. I have shown, diagrammatically, a pair of switch members $32^c$ and $32^d$ secured to and insulated from the bar $32^b$ and adapted to connect the contact portion at the ends of the conductors 21 and 22 and the conductors 33 and 34 connected with a source of electrical energy. It will be noted, therefore, that when the valve 24 is opened the conductors 21 and 22, connected with the heating elements of the electric water heater, are connected respectively with the conductors 33 and 34.

It is obvious from this construction as illustrated in the drawings and disclosed in the foregoing specification, that there is provided an electric water heater as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. An electric water heater, including separate spaced apart supporting members, a plurality of water tubes extending between and through said supporting members, end members positioned on the outer sides of said supporting members and extending across the ends of all of said tubes, said supporting members being recessed to provide recesses between the supporting and end members for connecting the ends of certain of said water tubes with each other, and electric heating units positioned adjacent and between adjacent water tubes and spaced therefrom, said heating units being removably positioned between and adjacent said water tubes and electrically connected in series with each other.

2. An electric water heater, including a frame, a plurality of flattened water tubes of a material of high heat conductivity, positioned between and secured through opposite portions of said frame, there being provided pockets at the outer portion of said frame for connecting adjacent ends of said water tubes, whereby said water tubes are connected in series with each other, end plates positioned on the outer sides of the tubes supporting portions of said frame, forming enclosed channels for connecting said water tubes, and insulating plates positioned between said tube supporting portions and said end plates, and between the outer water tubes and the other side portions of said frame.

3. An electric water heater, including a frame provided with water tube supporting members and spacing members, a plurality of flattened water tubes of a material of high heat conductivity, positioned between and secured through said supporting members, there being provided pockets at the outer portions of said supporting members for connecting adjacent ends of said water tubes, whereby said water tubes are connected in series with each other, and a plurality of removable heating units positioned adjacent each and between each pair of water tubes, and spaced therefrom.

4. An electric water heater, including a frame provided with water tube supporting members and spacing members, a plurality of flattened water tubes positioned between and secured to said supporting members, there being provided pockets at the outer portions of said supporting members for connecting adjacent ends of said water tubes, whereby said water tubes are connected in series with each other, end plates positioned on the outer sides of the supporting members of said frame forming enclosed channels for connecting said water tubes, insulating plates positioned between said supporting members and said end plates, and between the outer water tubes and said spacing members, and an inlet and an outlet conductor communicating with said water tubes and secured to said end plates.

5. In an electric water heater, the combination of a plurality of horizontally extending flattened water tubes, vertically extending supporting members for supporting said tubes, independently removable electric heating units located between and adjacent said tubes and electrically insulated therefrom, said supporting members being provided with recesses on their outer faces adjacent the ends of each pair of tubes, and outer end plates cooperating with said supporting members and bolted thereto to provide closed passageways for conducting water from one tube to the adjacent tube to thereby connect said tubes in series.

6. In an electric water heater, the combination of a plurality of independent flattened water tubes of high heat conductivity, independently removable heat-conducting electric-insulating members filling the space between adjacent tubes, electric heating elements encased in said insulating members, end supporting members for supporting said tubes in spaced relation to each other, tie members at the top and bottom of said heater, and end plates at each end of said tubes and spaced therefrom at intervals to provide sealed water passageways for connecting said tubes in series with each other, said end plates supporting members and tie members being bolted to each other to provide a unitary structure.

In testimony whereof, I have affixed my signature hereto.

SAMUEL D. NESMITH.